United States Patent
Ahn et al.

(10) Patent No.: US 10,554,698 B2
(45) Date of Patent: Feb. 4, 2020

(54) TERMINAL AND SERVER PROVIDING VIDEO CALL SERVICE

(71) Applicant: HYPERCONNECT, INC., Seoul (KR)

(72) Inventors: Sang Il Ahn, Chungcheongbuk-do (KR); Hyeok Choi, Seoul (KR)

(73) Assignee: HYPERCONNECT, INC., Seoul (KR)

( * ) Notice: Subject to any disclaimer, the term of this patent is extended or adjusted under 35 U.S.C. 154(b) by 0 days.

(21) Appl. No.: 16/198,161

(22) Filed: Nov. 21, 2018

(65) Prior Publication Data

US 2019/0207987 A1 Jul. 4, 2019

(30) Foreign Application Priority Data

Dec. 28, 2017 (KR) .................. 10-2017-0182782

(51) Int. Cl.
*H04N 7/14* (2006.01)
*H04L 29/06* (2006.01)
*G06K 9/00* (2006.01)
*G06F 3/0481* (2013.01)

(52) U.S. Cl.
CPC ...... *H04L 65/1069* (2013.01); *G06K 9/00315* (2013.01); *G06K 9/00335* (2013.01); *H04N 7/147* (2013.01); *G06F 3/04817* (2013.01)

(58) Field of Classification Search
CPC ....................................................... H04N 7/14
See application file for complete search history.

(56) References Cited

U.S. PATENT DOCUMENTS 9,531,998 B1* 12/2016 Farrell .................. A63F 13/352
2014/0043426 A1* 2/2014 Bicanic ............ H04N 21/41407
348/14.02

FOREIGN PATENT DOCUMENTS

| KR | 2011-0012491 A | 2/2011 |
| KR | 2013-0022434 A | 3/2013 |
| KR | 2015-0097337 A | 8/2015 |
| WO | WO-2013/027893 A1 | 2/2013 |

OTHER PUBLICATIONS

Office Action for Korean Patent Application No. 10-2017-0182782, dated Sep. 24, 2019.

* cited by examiner

*Primary Examiner* — Olisa Anwah
(74) *Attorney, Agent, or Firm* — Marshall, Gerstein & Borun LLP

(57) ABSTRACT

Provided are a terminal for providing a video call service by generating evaluation information corresponding to a gesture of a user of a video call service and a server for providing a video call service based on a reputation quotient of a user based on the evaluation information received from the terminal.

15 Claims, 10 Drawing Sheets

TERMINAL AND SERVER PROVIDING VIDEO CALL SERVICE

CROSS-REFERENCE TO RELATED APPLICATION

This application claims the benefit of Korean Patent Application No. 10-2017-0182782, filed on Dec. 28, 2017, in the Korean Intellectual Property Office, the disclosure of which is incorporated herein in its entirety by reference.

BACKGROUND

1. Field

One or more embodiments relate to a terminal for providing a video call service and a server for providing a video call service.

2. Description of the Related Art

With the development of science and technology, most people have possessed terminals such as smartphones or tablet PCs. Such a terminal may capture or replay images, exchange information by communicating with other terminals, or support a video call.

There are various types of video call services based on a video call. For example, a random video chatting service is a service for connecting a terminal of one user requesting use of a random video chatting service to a terminal of another user randomly selected from among users using the random video chatting service.

SUMMARY

One or more embodiments include a terminal for providing a video call service by generating evaluation information corresponding to a gesture of a user of a video call service, and a server for providing a video call service based on a reputation quotient of a user based on the evaluation information received from the terminal Additional aspects will be set forth in part in the description which follows and, in part, will be apparent from the description, or may be learned by practice of the presented embodiments.

According to one or more embodiments, a method of providing a video call service includes establishing a video call session between a first terminal of a first user and a second terminal of a second user who is a counterpart of the video call, detecting a gesture of the first user or the second user from a first video stream that captures the first user or from a second video stream that captures the second user, the second video stream being received from the second terminal, generating evaluation information about a counterpart of a user making the detected gesture, based on the detected gesture, and transmitting generated evaluation information to a server for providing a video call service.

According to one or more embodiments, a server for providing a video call service includes a communication interface configured to perform communication with a terminal supporting a video call, a storage, a processor, and a memory configured to store instructions that are executable by the processor, wherein the processor, by executing the instructions, receives evaluation information about a user using the video call service from the terminal, updates accumulated evaluation information and a reputation quotient corresponding to a user account stored in the storage, based on received evaluation information, and manages the video call service based on an updated reputation quotient.

According to one or more embodiments, in a non-transitory computer-readable storage medium storing instructions that are executable by a processor, the instructions includes instructions to establish a video call session between a first terminal of a first user and a second terminal of a second user who is a counterpart of the video call, instructions to detect a gesture of the first user or the second user from a first video stream that captures the first user or from a second video stream that captures the second user, the second video stream being received from the second terminal, instructions to generate evaluation information about a counterpart of a user making the detected gesture, based on the detected gesture, and instructions to transmit generated evaluation information to a server for providing a video call service.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
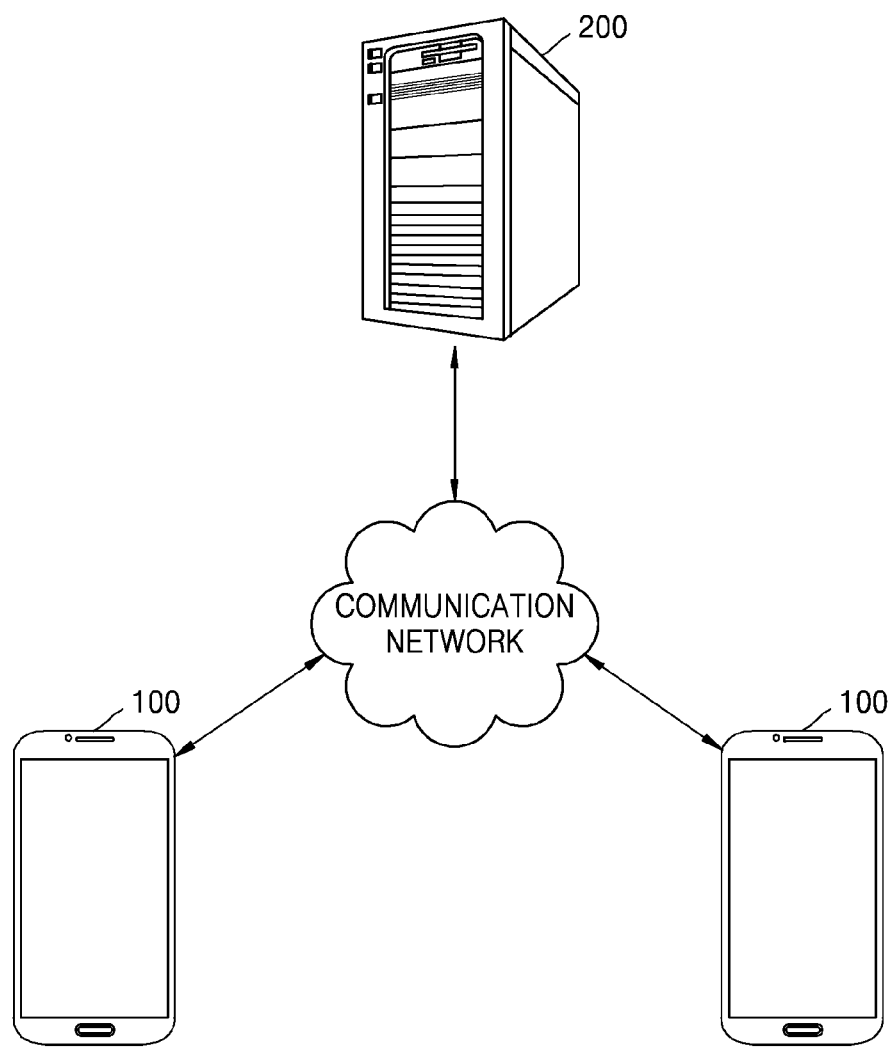
FIG. 1 illustrates an environment in which a video call service is provided.

The present disclosure will now be described more fully with reference to the accompanying drawings, in which embodiments of the disclosure are shown. In the following description, when detailed descriptions about related well-known functions or structures are determined to make the gist of the present disclosure unclear, the detailed descriptions will be omitted herein. Throughout the drawings, like reference numerals denote like elements.

In the present specification, when a constituent element "connects" or is "connected" to another constituent element, the constituent element contacts or is connected to the other constituent element not only directly, but also electrically through at least one of other constituent elements interposed therebetween. Also, when a part may "include" a certain constituent element, unless specified otherwise, it may not be construed to exclude another constituent element but may be construed to further include other constituent elements.

Terms such as "first" and "second" are used herein merely to describe a variety of constituent elements, but the constituent elements are not limited by the terms. Such terms are used only for the purpose of distinguishing one constituent element from another constituent element.

The present embodiments relate to a terminal for providing a video call service and a server for providing a video call service, and detailed descriptions of items that have been widely known to a person having ordinary skill in the art to which the following embodiments belong are omitted.

FIG. 1 illustrates an environment in which a video call service is provided.

A video call service may signify a service through which a plurality of users may transmit each user's video to a counterpart by using each user's terminal or receive the counterpart's video in the same manner, thereby communicating with one another. Users using a video call service may exchange video and voice through each user's terminal and exchange text through a chatting function. A user who desires to use a video call service with a counterpart may use the video call service by directly appointing a counterpart or as a server for providing a video call service appoints a counterpart randomly or in a certain method.

Referring to FIG. 1, a terminal 100 is connected to a server 200 for providing a video call service via a communication network. The server 200 may store data and various programs or applications for assisting a plurality of users to use a video call service by using the terminal 100 of each user. The server 200 for providing a video call service may perform both local communication and remote communication. The server 200 for providing a video call service may be connected to a plurality of terminals 100 via a communication network. The terminal 100 may include various types of user terminals connected to the server 200 for providing a video call service. For example, the terminal 100 is a device for communicating with the server 200 for providing a video call service, and may include a wearable device such as a smart watch, a mobile device such as a smart phone, a tablet PC, and a laptop computer, and a stationary device such as a desktop computer. Furthermore, the terminal 100 may be a video call device for supporting a video call and may be capable of capturing and replaying a video so that a video call may be performed between users connected through a video call service.

Figure 2:
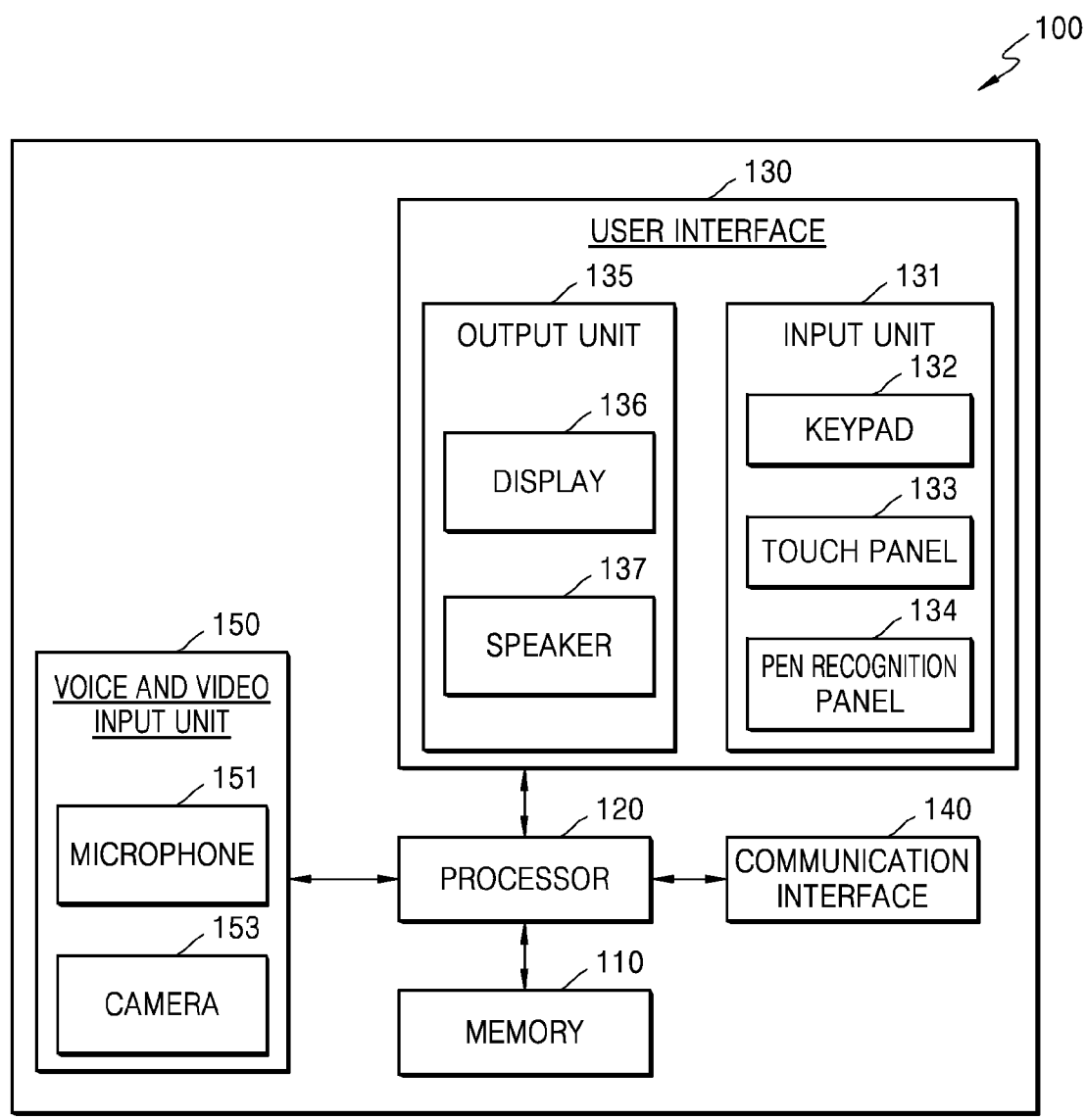
FIG. 2 is a block diagram of a configuration of a terminal according to an embodiment.

FIG. 2 is a block diagram of a configuration of the terminal 100 according to an embodiment.

Referring to FIG. 2, the terminal 100 may include a memory 110, a processor 120, a user interface 130, a communication interface 140, and a voice and video input unit 150. A person having ordinary skill in the art related to the present embodiment may see that other general purpose elements may be included in addition to the constituent elements illustrated in FIG. 2.

The memory 110 may store software or a program. For example, the memory 110 may store an application, a program such as application programming interface (API), and various types of data. The memory 110 may store instructions executable by the processor 120.

The processor 120 may execute the instructions stored in the memory 110. The processor 120 may use various programs, contents, and data stored in the memory 110, or store new programs, contents, and data in the memory 110.

The processor 120 may access the memory 110 and perform booting by using an operating system (O/S) stored in the memory 110. The processor 120 may perform various operations by using the programs, contents, and data stored in the memory 110. For example, the processor 120 may display a certain screen on a display 136 by using the programs, contents, and data stored in the memory 110. When a user performs an operation in an area of the display 136, the processor 120 may perform a control operation in response to the user's operation.

The processor 120 may include a graphics processing unit (GPU) specialized for graphing processing. When booting of the terminal 100 is completed, a GPU displays a user interface screen in an area of the display 136. In detail, the GPU may generate a screen displaying a video call layout including various objects such as contents, icons, and menus. The GPU may calculate attribute values such as a coordinate value, shape, size, and color to display the respective objects according to the video call layout of a screen. The GPU may generate a screen of various layouts including objects based on the calculated attribute values. The screen generated by the GPU may be provided to the display 136 and displayed in each area of the display 136.

The processor 120 may include a video processor and an audio processor. The processor 120 may control the video processor and the audio processor, and process a video stream received through the communication interface 140 or video data or audio data included in the video stream stored in the memory 110.

The user interface 130 may include an input unit 131 and an output unit 135.

The input unit 131 may receive an input of various instructions from a user. The input unit 131 may include at least one of a keypad 132, a touch panel 133, and a pen recognition panel 134.

The keypad 132 may include various types of keys such as mechanical buttons, and wheels formed in various areas such as a front surface portion, a side surface portion, or a rear surface portion of the exterior of a main body of the terminal 100.

The touch panel 133 may detect a touch pressure by a user, and output a touch event value corresponding to a detected touch signal. When the touch panel 133 is coupled to a display panel forming a touch screen, the touch screen may be implemented by various types of touch sensors such as an electrostatic type, a pressure-sensitive type, and a piezoelectric type.

The pen recognition panel 134 may detect a proximity input or a touch input of a pen according to an operation of a touch pen, for example, a stylus pen, by the user, and when the input is detected, output a detected pen proximity event or pen touch event. The pen recognition panel 134 may be implemented by, for example, an electromagnetic radiation (EMR) method, and may detect a touch or a proximity input according to a change in the intensity of an electromagnetic field by the proximity or touch of a pen. The pen recognition panel 134 may include an electromagnetic induction coil sensor having a grid structure and an electronic signal processing unit sequentially providing AC signals having a certain frequency to each loop coil of the electromagnetic induction coil sensor.

The output unit 135 may include the display 136 and a speaker 137.

The display 136 may include a display panel and a controller for controlling the display panel. The display panel may be implemented by various methods such as a liquid crystal display (LCD), an organic light-emitting diode (OLED) display, an active-matrix OLED (AM-OLED) display, and a plasma display panel (PDP). The display panel may be implemented to be flexible or wearable. The display 136 may be coupled to the touch panel 133 of the input unit 131 and provided as a touch screen.

The speaker 137 may output sound based on audio data. For example, the speaker 137 may output the voice of the user according to the audio data included in the video stream.

The communication interface 140 may perform communication with various types of external devices according to various types of communication methods. The communication interface 140 may include at least one of a Wi-Fi chip, a Bluetooth chip, a near field communication (NFC) chip, and a wireless communication chip. The processor 120 may perform communication with various external devices by using the communication interface 140.

The Wi-Fi chip and the Bluetooth chip may perform communication in a Wi-Fi method and a Bluetooth method, respectively. When the Wi-Fi chip or the Bluetooth chip is used, various connection information such as a service set identifier (SSID) and a session key are first transceived, and thus, communication is established by using the information and then various pieces of information may be transceived. The NFC chip may signify a chip that is operated by a NFC method using a 13.56 MHz band among various RF-ID frequency bands. The wireless communication chip may signify a chip that performs communication according to various communication protocols such as the Institute of Electrical and Electronics Engineers (IEEE), Zigbee, 3rd generation (3G), 3rd generation partnership project (3GPP), long term evolution (LTE), and 5th generation (5G).

The voice and video input unit 150 may include a microphone 151 and a camera 153. The microphone 151 may receive and convert a user's voice or other sounds to audio data. The processor 120 may use the user's voice input through the microphone 151 for a video call or convert the user's voice to audio data and store the audio data in the memory 110. The camera 153 may capture a still video or motion video under the control of the user. The camera 153 may be a camera module located on the front surface or the rear surface of the terminal 100. The processor 120 may generate a video stream for a video call by using the voice input through the microphone 151 and the video captured by the camera 153

The terminal 100 may be operated in a motion control mode or a voice control mode. When operated in a motion control mode, the processor 120 may activate the camera 153 to capture a user and track a motion change of the user, and perform a control operation corresponding thereto. When operated in a voice control mode, the processor 120 may analyze the user's voice input through the microphone 151, and perform a control operation according to an analyzed user voice.

The names of the constituent elements of the terminal 100 may vary. Furthermore, according to the present disclosure, the terminal 100 may include at least one of the above-described constituent elements, or some constituent elements may be omitted or other additional constituent elements may be further included. The terminal 100 may perform the following operation by using at least one of the above-described constituent elements.

Figure 3:
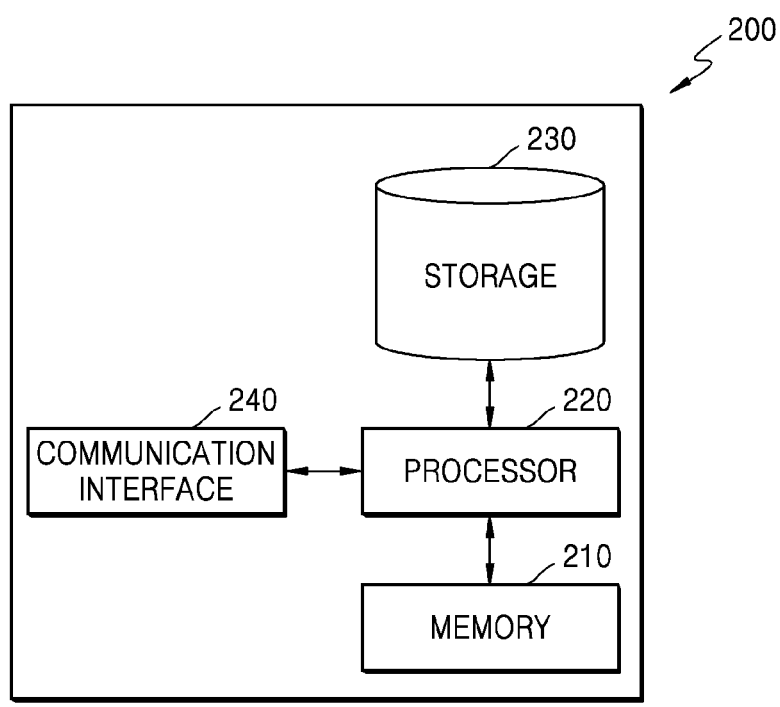
FIG. 3 is a block diagram of a configuration of a server for providing a video call service according to an embodiment.

FIG. 3 is a block diagram of a configuration of a server 200 for providing a video call service according to an embodiment.

Referring to FIG. 3, the server 200 for providing a video call service may include a memory 210, a processor 220, a storage 230, and a communication interface 240. A person having ordinary skill in the art related to the present embodiment may see that other general purpose elements may be included in addition to the constituent elements illustrated in FIG. 3. Each of the constituent elements of FIG. 3 may be separated, added, or omitted according to a method of implementing the server 200 for providing a video call service. In other words, according to the implementation method, one constituent element may be segmented into two or more constituent elements, two or more constituent elements may be assembled into one constituent element, or some constituent elements may be further added or removed.

The memory 210 may store instructions that are executable by the processor 220. The memory 210 may store software or a program.

The processor 220 may execute the instructions stored in the memory 210. The processor 220 may control overall operations of the server 200 for providing a video call service. The processor 220 may obtain information and requests received through the communication interface 240, and store the received information in the storage 230. Furthermore, the processor 220 may process the received information. For example, the processor 220 may generate information used for a video call service from the information received from the terminal 100 or perform a process to manage the received information, and store the information in the storage 230. Furthermore, the processor 220, in response to the request obtained from the terminal 100, may transmit information for providing a video call service to the terminal 100 through the communication interface 240, by using the information stored in the storage 230.

The storage 230 may store various software and information needed for providing a video call service by the server 200. For example, the storage 230 may store programs and applications executed on the server 200 for providing a video call service, and various data used for a video call service.

The storage 230 may store and manage a database of personal information for each user using a video call service. The storage 230 may store personal information of a user for each account for accessing the server 200 for providing a video call service and various pieces of information used for a video call service.

The communication interface 240 may perform communication with an external device including the terminal 100. For example, the server 200 for providing a video call service may receive, from the terminal 100, a video call service start request and a request for setting information to establish a video call service environment, and provide information related to the video call service, in response to the request of the terminal 100.

Figure 4:
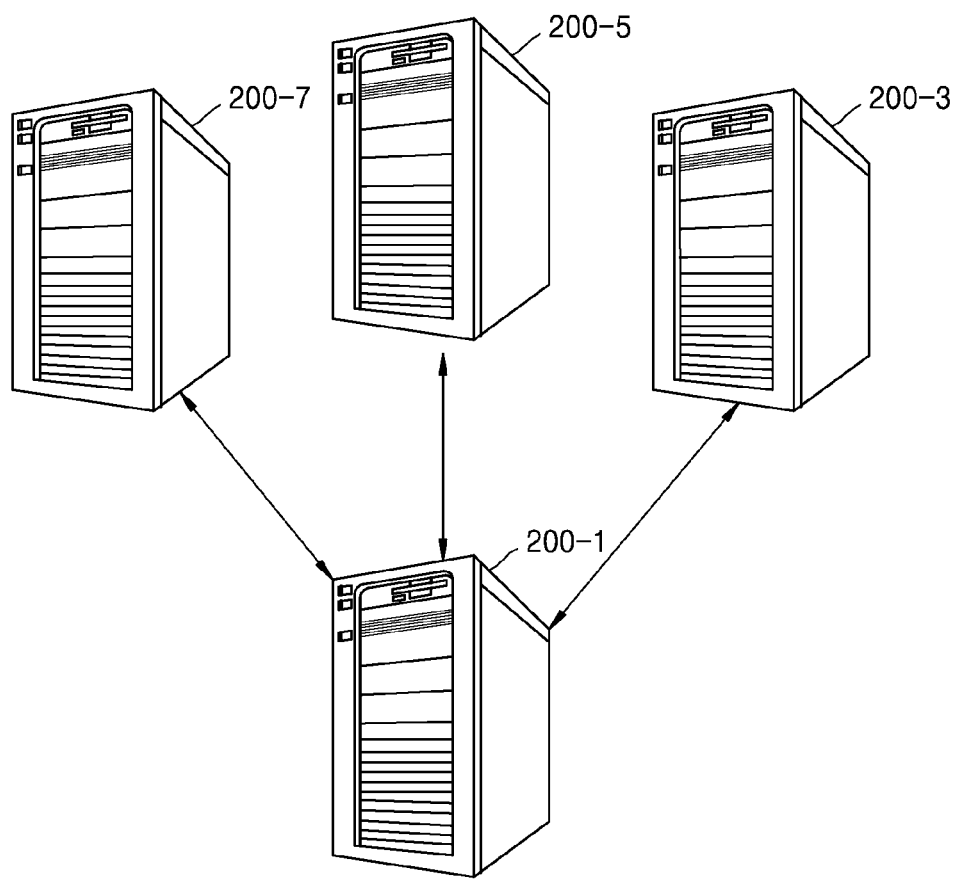
FIG. 4 illustrates that the server for providing a video call service is implemented by a plurality of distributed servers, according to another embodiment.

FIG. 4 illustrates that the server 200 for providing a video call service is implemented by a plurality of distributed servers, according to another embodiment. The above descriptions related to the server 200 for providing a video call service may be applied to the present embodiment, without change, even though they are omitted below.

Referring to FIG. 4, distributed servers for providing a video call service may include a load distribution server 200-1 and function servers 200-3, 200-5, and 200-7 for providing a video call service. The load distribution server 200-1, in response to a request for a video call service of an external device such as the terminal 100, may determine one of the function servers 200-3, 200-5, and 200-7 that provide a video call service and connect the determined server to the terminal 100, or monitor states of the function servers 200-3, 200-5, and 200-7 that provide a video call service to select an optimal server and connect the selected server to the terminal 100.

Figure 5:
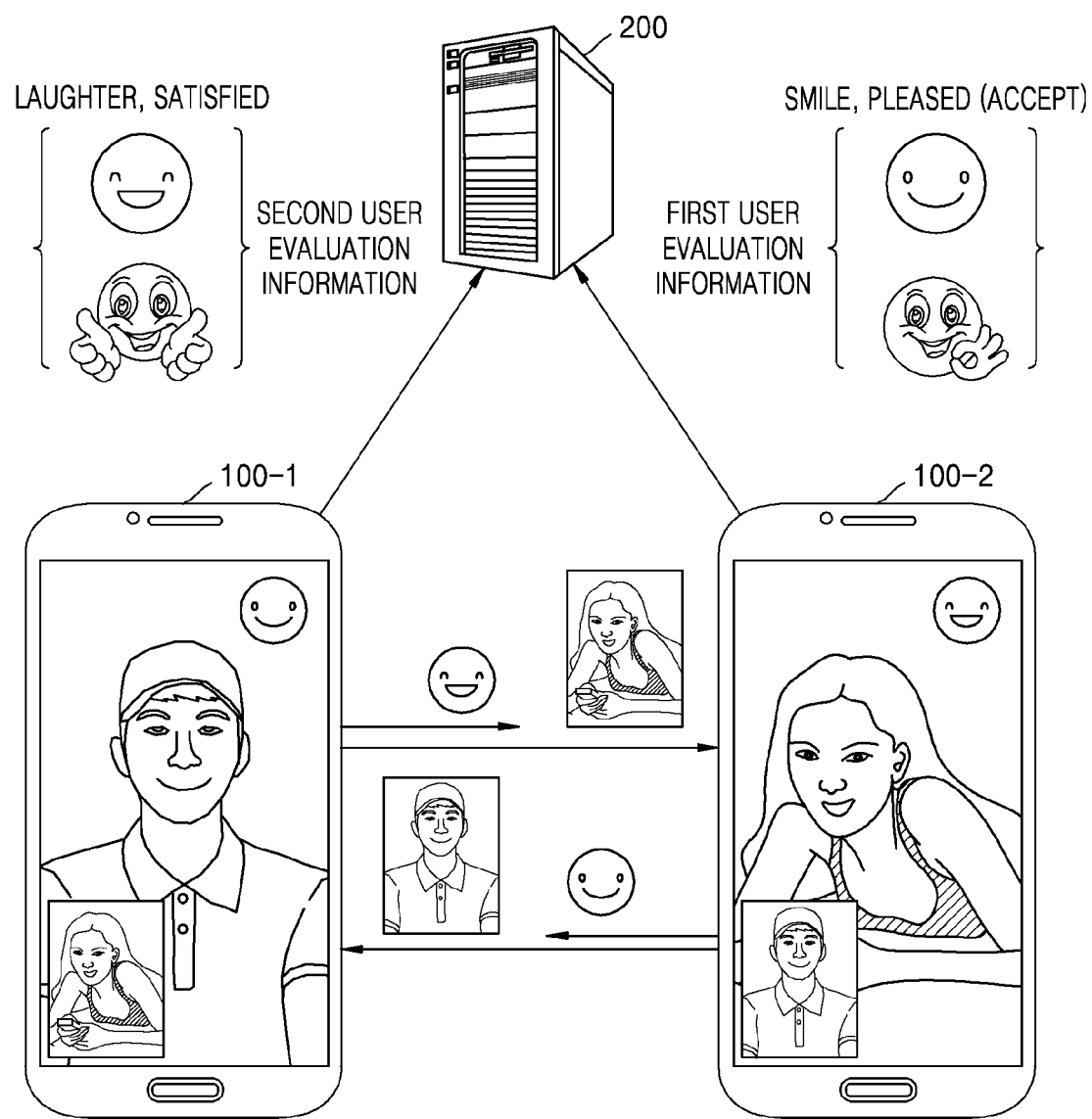
FIG. 5 illustrates a process of generating evaluation information about a second user based on a gesture of a first user, according to an embodiment.

FIG. 5 illustrates a process of generating evaluation information about a second user based on a gesture of a first user, according to an embodiment.

Referring to FIG. 5, a first user and a second user, who is a counterpart of a video call, may perform a video call through a first terminal 100-1 and a second terminal 100-2, respectively. An application for providing a video call service provided by a video call service provider may be installed on each of the first terminal 100-1 and the second terminal 100-2. The first terminal 100-1 and the second terminal 100-2 may execute the application for providing a video call service to be connected to the server 200 for providing a video call service, and receive the video call service provided by the server 200.

The first terminal 100-1 may transmit a request to use a video call service to the server 200 for providing a video call service. The server 200 for providing a video call service, in response to the request to use a video call service by the first terminal 100-1, may provide information needed for a video call to the first terminal 100-1 to allow a video call with the second terminal 100-2 of the second user, who is the counterpart of the video call. The server 200 for providing a video call service, in response to the request to use a video call service by the first terminal 100-1, may randomly select a counterpart of the video call, select a counterpart according to a certain rule, or select one who is designated by the first user as a counterpart. The first terminal 100-1 of the first user and the second terminal 100-2 of the second user may establish a video call session therebetween for a video call.

When a video call session is established between the first terminal 100-1 and the second terminal 100-2, a first video stream that captures the first user may be transmitted from the first terminal 100-1 to the second terminal 100-2, and a second video stream that captures the second user may be transmitted from the second terminal 100-2 to the first terminal 100-1. The first terminal 100-1 may receive the second video stream from the second terminal 100-2, and the second terminal 100-2 may receive the first video stream from the first terminal 100-1.

The first terminal 100-1 may obtain the first video stream that captures the first user or the second video stream that captures the second user, which is received from the second terminal 100-2. The second terminal 100-2 may obtain the second video stream that captures the second user or the first video stream that captures the first user, which is received from the first terminal 100-1.

The first terminal 100-1 may display a video of the second user based on the second video stream on a screen of the first terminal 100-1, and display a video of the first user based on the first video stream in a partial area of the screen on which the video of the second user is displayed. The second terminal 100-2 may display a video of the first user based on the first video stream on the screen of the second terminal 100-2, and display a video of the second user based on the second video stream in a partial area of the screen on which the video of the first user is displayed. As illustrated in FIG. 5, the first terminal 100-1 may display the video of the second user on the screen of the first terminal 100-1 and simultaneously display the video of the first user on the screen of the first terminal 100-1 in a partial area of a relatively small display size. The second terminal 100-2 may display the video of the first user on the screen of the second terminal 100-2 and simultaneously display the video of the second user on the screen of the second terminal 100-2 in a partial area of a relatively small display size.

When the same application to provide a video call service is executed in each of the first terminal 100-1 and the second terminal 100-2, and a video call is conducted between the first user and the second user, the operations and the functions of the applications of the first terminal 100-1 and the second terminal 100-2 are the same. Accordingly, the first terminal 100-1 is mainly described, but the description of the second terminal 100-2 is omitted.

When a video call service is performed between the first terminal 100-1 and the second terminal 100-2, the first terminal 100-1 may detect a gesture of a first user from the first video stream that captures the first user. The first terminal 100-1 may detect at least one gesture of facial expressions, body motions, and actions of the first user from the first video stream captured by the first terminal 100-1.

A gesture may signify, for example, non-verbal communication using a face, a hand, or a body of a user, which may include a facial expression, a hand gesture, or a body motion. As a user makes a gesture, the user may express one's opinion to a counterpart or induce a reaction from the counterpart. A facial expression may be a movement of, for example, an eye, an eyebrow, a nose, a mouth, a forehead, or a cheek of a user's face, to express one's thought. For example, the facial expression may include blinking the eyes, opening the eyes wide or closing the eyes, raising corners of the lips, opening the mouth, biting the lips, or frowning. A hand gesture may be, for example, a certain shape of a user's hand or an action made by using the user's hand to express ones thought, and a body motion may be, for example, a certain shape of a user's body or an action taken by using the user's body to express ones thought. The hand gesture may include making an OK sign, thumbs-up or thumbs-down, making a V sign, shaking a hand back and forth, or shaking a hand left and right. A body motion may include, for example, twisting a body, moving the shoulders up and down, or crossing the arms.

Referring to FIG. 5, the first terminal 100-1 displays a video in which the second user smiles, on the screen of the first terminal 100-1, and displays a video in which the first user laughs, in a lower left area of the screen in which the video of the second user is displayed. The first terminal 100-1 may detect a facial expression of the first user laughing from the first video stream that captures the first user. For example, when the first user conducts a hand gesture of thumbing up, the first terminal 100-1 may detect the first user's hand gesture of thumbing up from the first video stream. The first terminal 100-1 may detect a gesture of the first user from the first video stream based on a feature on a face, a hand, or a body of the first user from the first video stream. The first terminal 100-1 may continuously detect the first user's gesture in real time or at a certain interval.

The first terminal 100-1 may generate evaluation information about the second user who is a counterpart of the first user making the detected gesture, based on the detected gesture of the first user. The first terminal 100-1 may generate emotion information or icon information corresponding to the detected gesture as the evaluation information about the second user.

Since a gesture is an expression of a user's opinion by consciously or unconsciously using a face, a hand, or a body, each gesture may have corresponding emotion information. The emotion information may signify emotion of the user or a mood, an atmosphere, or an expression that causes emotion, according to the gesture. For example, the emotion information may include joy, happiness, rage, pleasure, suffering, sadness, depression, drowsiness, boredom, curiosity, displeasure, satisfaction, smiling, laughter, winking, crying, positiveness, negativeness, good (acceptance), or dislike (rejection).

Furthermore, each gesture may have corresponding icon information. The icon information may be an intuitive illustration of a gesture as a similar figure or a picture or a symbol indicating emotion information corresponding to the gesture. For example, the icon information may include a picture of a shape of pattern corresponding to each of the user's facial expression, hand gesture, and body motion, or include a symbol or a character expressing the emotion information.

Referring to FIG. 5, the first terminal 100-1 may generate evaluation information about the second user based on the detected laughing facial expression of the first user. For example, the first terminal 100-1 may generate emotion information of "laughter" or icon information of a "laughing face icon" corresponding to the first user's laughing facial expression, as the evaluation information about the second user who is a counterpart of the first user who makes a laughing facial expression. In another example, when the first user makes a hand gesture of thumbing up, the first terminal 100-1 may generate emotion information of "satisfied" or icon information of a "thumbs-up icon" corresponding to the first user's hand gesture of thumbing up, as the evaluation information about the second user who is a counterpart of the first user making a hand gesture of thumbing up, based on the first user's hand gesture of thumbing up. Since the gesture that the first user makes is a response to the attitude or action of the second user, when a gesture of the first user is detected from the first video stream, the first user's gesture is used as a ground of the evaluation information about the second user who is a counterpart of the first user who caused the detected gesture.

The first terminal 100-1 may transmit the evaluation information about the second user generated by the first terminal 100-1 to the server 200 for providing a video call service. The first terminal 100-1 may transmit the evaluation information about the second user to the server 200 for providing a video call service by matching the evaluation information about the second user with a second user's account. As illustrated in FIG. 5, the first terminal 100-1 may transmit the emotion information or icon information generated based on the gesture of the first user detected from the first video stream, to the server 200 for providing a video call service. Likewise, the second terminal 100-2 may transmit the emotion information or icon information generated based on the gesture of the second user detected from the second video stream, to the server 200 for providing a video call service.

The first terminal 100-1 may transmit the evaluation information about the second user to the second terminal 100-2. Since the evaluation information about the second user is generated by the first terminal 100-1 based on the gesture of the first user detected from the first video stream, a positive conversation and a positive gesture may be induced between the users conducting a video call by giving feedback to the second user about how the second user is evaluated. Referring to FIG. 5, the icon information of the "laughing face icon" corresponding to the first user's laughing facial expression may be transmitted from the first terminal 100-1 to the second terminal 100-2. According to the icon information transmitted to the second terminal 100-2, the "laughing face icon" may be displayed overlapping the area where the first video stream is displayed in the second terminal 100-2. Accordingly, the second user may see that the emotion information or icon information corresponding to the laughing facial expression generated as the first user who is a counterpart of a video call makes a laughing facial expression is obtained as second user evaluation information.

In contrast, the first terminal 100-1 may receive the evaluation information about the first user from the second terminal 100-2, and display the received evaluation information about the first user overlapping the area where the area where the second video stream is displayed. Since the evaluation information about the first user is generated by the second terminal 100-2 based on the gesture of the second user detected from the second video stream of the second terminal 100-2, the first user may be given feedback about how the first user is evaluated. Referring to FIG. 5, when the second user smiles, the second terminal 100-2 may detect a facial expression that the second user smiles from the second video stream that captures the second user, emotion information of "smile" or icon information of "smile icon" corresponding to the smiling facial expression may be generated as the evaluation information about the first user who is a counterpart of the second user making a smiling facial expression. The icon information of "smile icon" corresponding to the smiling facial expression of the second user may be transmitted from the second terminal 100-2 to the first terminal 100-1. According to the icon information transmitted to the first terminal 100-1, the "smile icon" may be displayed in the first terminal 100-1 overlapping the area where the second video stream is displayed. Accordingly, the first user may see that the emotion information or icon information corresponding to the smiling facial expression generated as the second user who is the counterpart of the video call makes a smiling facial expression is obtained as first user evaluation information.

Figure 6:
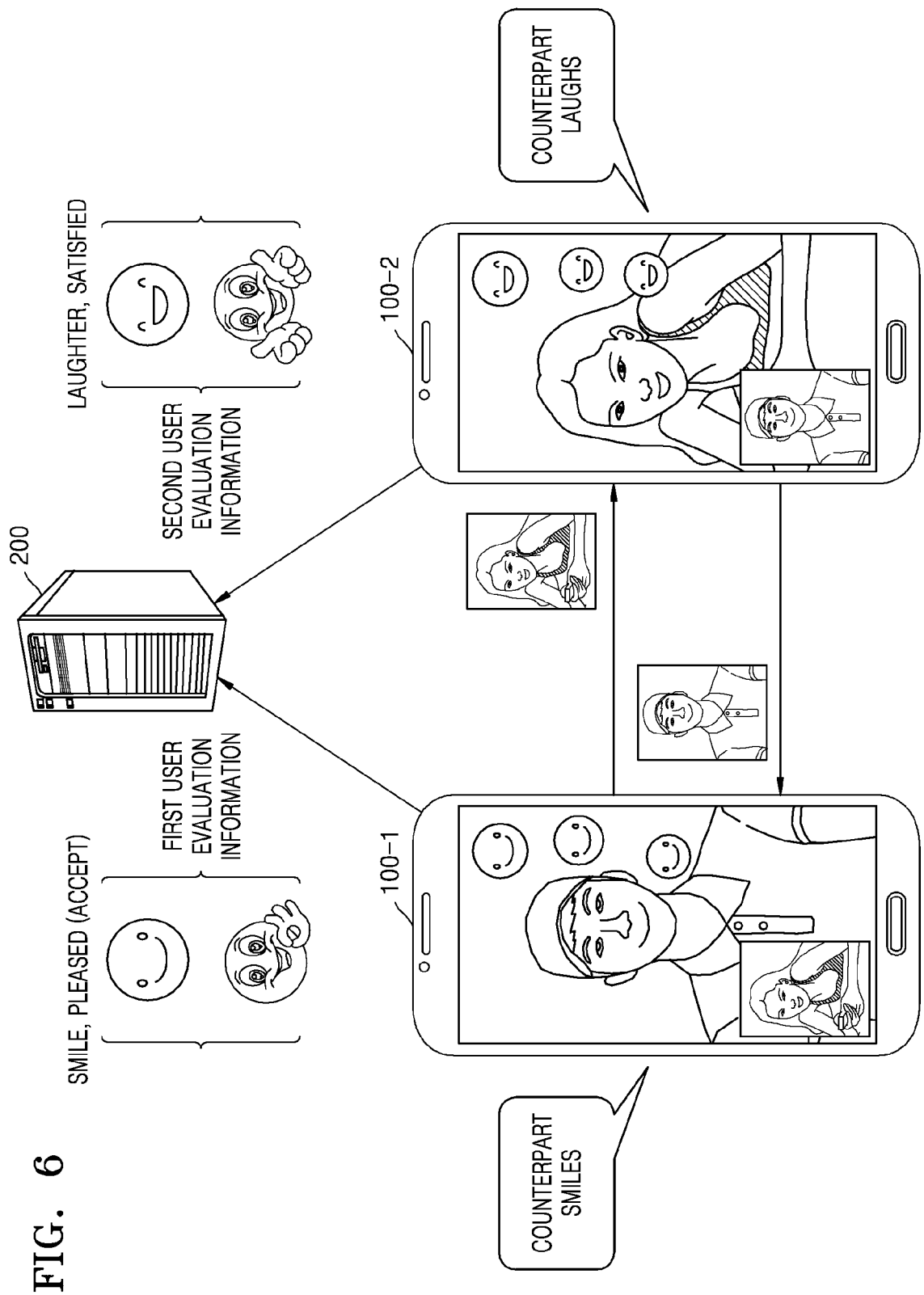
FIG. 6 illustrates a process of generating evaluation information about a first user based on a gesture of a second user, according to an embodiment.

FIG. 6 illustrates a process of generating evaluation information about the first user based on a gesture of the second user, according to an embodiment.

Since a process of establishing a video call session with the second terminal 100-2 of the second user who is the counterpart of the video call in response to a request to use a video call service by the first terminal 100-1 is the same as the process described in FIG. 5, a description thereof is omitted.

Referring to FIG. 6, when a video call service is conducted between the first terminal 100-1 and the second terminal 100-2, the first terminal 100-1 may detect a gesture of the second user from the second video stream that captures the second user and is received from the second terminal 100-2. The first terminal 100-1 may detect at least one gesture of facial expressions, body motions, and actions of the second user from the second video stream captured by the second terminal 100-2.

Referring to FIG. 6, the first terminal 100-1 may display a video in which the second user smiles on the screen of the first terminal 100-1, and a video in which the first user laughs in the lower left area of the screen where the video of the second user is displayed. The first terminal 100-1 may detect a smiling facial expression of the second user from the second video stream that captures the second user. For example, when the second user makes an OK sign hand gesture, the first terminal 100-1 may detect a hand gesture of the second user making an OK signal hand gesture from the second video stream. The first terminal 100-1 may detect a gesture of the second user from the second video stream based on a feature on a face, a hand, or a body of the second user from the second video stream. The first terminal 100-1 may continuously detect the second user's gesture in real time or at a certain interval.

The first terminal 100-1 may generate evaluation information about the first user who is a counterpart of the second user making the detected gesture, based on the detected gesture of the second user. The first terminal 100-1 may generate emotion information or icon information corresponding to the detected gesture as the evaluation information about the first user.

Referring to FIG. 6, the first terminal 100-1 may generate evaluation information about the first user based on the detected smiling facial expression of the second user. For example, the first terminal 100-1 may generate emotion information of "smile" or icon information of "smile icon" corresponding to the second user's smiling facial expression, as the evaluation information about the first user who is a counterpart of the second user making a smiling facial expression. In another example, when the second user makes a hand gesture of an OK sign, the first terminal 100-1 may generate emotion information of "good (accept)" or icon information of an "OK icon" corresponding to the second user's hand gesture of an OK sign, as the evaluation information about the first user who is a counterpart of the second user making a hand gesture of an OK sign, based on the second user's hand gesture of an OK sign. Since the gesture that the second user makes is a response to the attitude or action of the first user, when a gesture of the second user is detected from the second video stream, the second user's gesture is used as a ground of the evaluation information about the first user who is a counterpart of the second user who caused the detected gesture.

The first terminal 100-1 may transmit the evaluation information about the first user generated by the first terminal 100-1 to the server 200 for providing a video call service. The first terminal 100-1 may transmit the evaluation information about the first user to the server 200 for providing a video call service by matching the evaluation information about the first user with a first user's account. As illustrated in FIG. 6, the first terminal 100-1 may transmit the emotion information or icon information generated based on the gesture of the second user detected from the second video stream, to the server 200 for providing a video call service. Likewise, the second terminal 100-2 may transmit the emotion information or icon information generated based on the gesture of the first user detected from the first video stream, to the server 200 for providing a video call service.

The first terminal 100-1 may display the evaluation information about the first user generated by the first terminal 100-1 overlapping the area where the second video stream is displayed. Since the evaluation information about the first user is generated by the first terminal 100-1 based on the gesture of the second user detected from the second video stream, a positive conversation and a positive gesture may be induced between the users conducting a video call by giving feedback to the first user about how the first user is evaluated. Referring to FIG. 6, since the icon information of "smile icon" corresponding to the smiling facial expression of the second user is generated by the first terminal 100-1, the "smile icon" may be displayed in the first terminal 100-1 overlapping the area where the second video stream is displayed. Furthermore, since the emotion information of "smile" is generated by the first terminal 100-1 corresponding to the smiling facial expression of the second user, the first terminal 100-1 may output a voice sound that "The counterpart smiles". Accordingly, the first user may see that the emotion information or icon information corresponding to the smiling facial expression generated as the second user who is the counterpart of the video call makes a smiling facial expression is obtained as the first user evaluation information.

Referring to FIG. 6, when the first user laughs, the second terminal 100-2 may detect the first user's laughing facial expression from the first video stream that captures the first user, and generate the emotion information of "laughter" or the icon information of the "laughing face icon" corresponding to the laughing facial expression, as the evaluation information about the second user who is a counterpart of the first user making a laughing facial expression. The icon information of the "laughing face icon" corresponding to the first user's laughing facial expression may be displayed in the second terminal 100-2 overlapping the area where the first video stream is displayed. Furthermore, since the emotion information of "laughter" corresponding to the first user's laughing facial expression is generated by the second terminal 100-2, the second terminal 100-2 may output a voice sound that "The counterpart laughs". Accordingly, the second user may see that the emotion information or icon information corresponding to the laughing facial expression generated as the first user who is a counterpart of a video call makes a laughing facial expression is obtained as the second user evaluation information.

Figure 7:
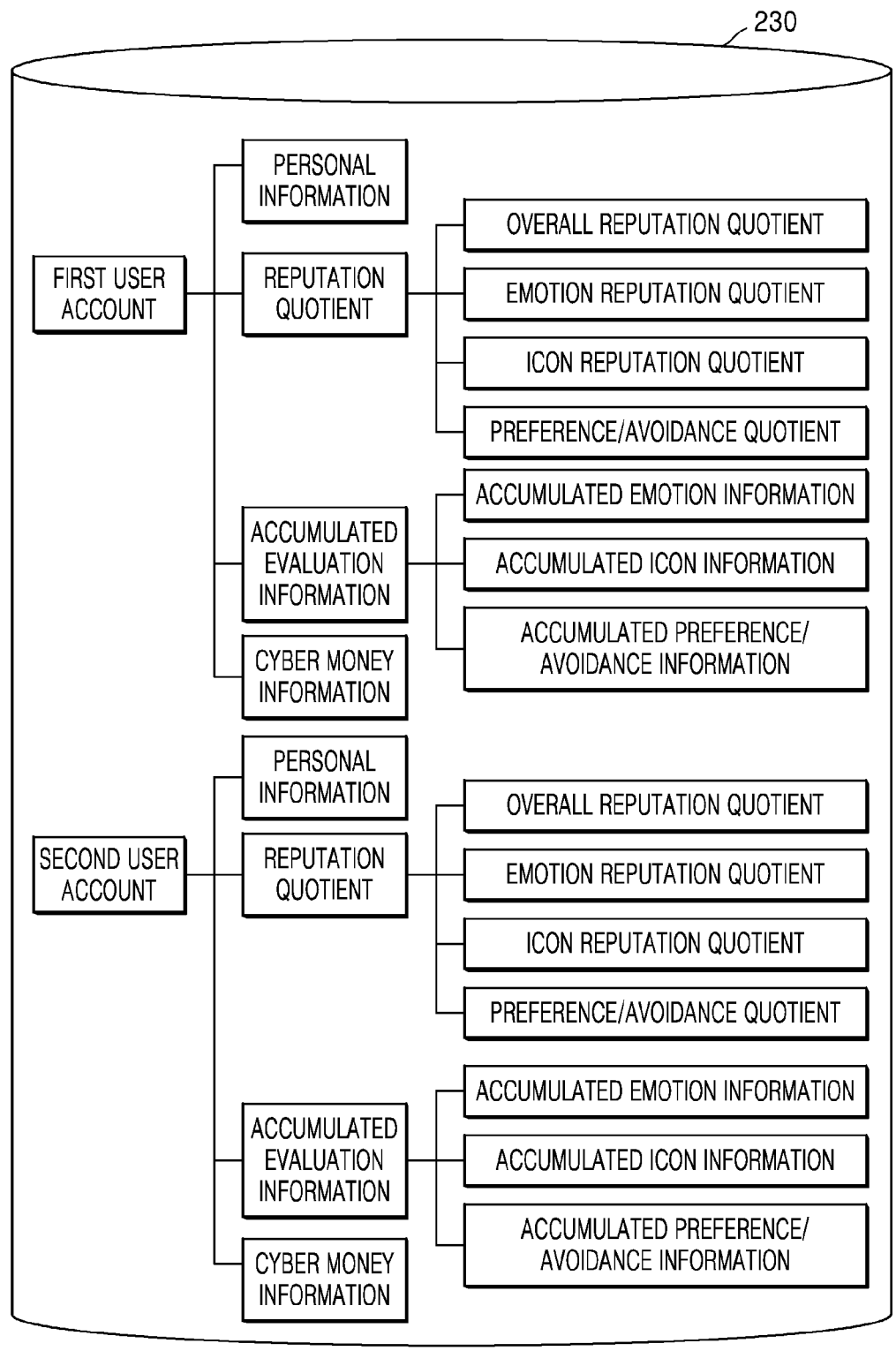
FIG. 7 illustrates a type of information stored in a storage of a server for providing a video call service according to an embodiment.

FIG. 7 illustrates a type of information stored in the storage 230 of the server 200 for providing a video call service according to an embodiment.

As described above with reference to FIGS. 5 and 6, the server 200 for providing a video call service may receive evaluation information about a user who uses a video call service from the first terminal 100-1 or the second terminal 100-2. The storage 230 of the server 200 for providing a video call service may store not only the evaluation information about the user, but also various pieces of information needed for the server 200 for providing a video call service to provide a video call service.

Referring to FIG. 7, the storage 230 of the server 200 for providing a video call service may store a plurality of types of accumulated evaluation information, a reputation quotient corresponding to each accumulated evaluation information, and an overall reputation quotient reflecting all types of reputation quotients, for each account of a user of a plurality of users using a video call service.

For example, the accumulated evaluation information may include accumulated emotion information, accumulated icon information, and accumulated preference/avoidance information, according to the type. The accumulated emotion information may be, for example, information in an accumulated form of the emotion information received from the terminal 100 using a video call service, and the accumulated icon information may be, for example, information in an accumulated form of the icon information received from the terminal 100. The emotion information or icon information may be the evaluation information about the user corresponding to the gesture of a counterpart of the user who uses the video call service, in the first video stream that captures the first user or the second video stream that captures the second user. The accumulated preference/avoidance information may be, for example, information of an accumulated form of the preference/avoidance information received from the terminal 100. The preference/avoidance information may be generated as the user using a video call service directly inputs likability or unlikability of a counterpart of a video call during or after the video call.

The reputation quotient may be an index indicating how one user of a video call service is evaluated by another user.

The overall reputation quotient may reflect the reputation quotient and all types of reputation quotients corresponding to each piece of the accumulated evaluation information. For example, the emotion reputation quotient may be acquired based on the accumulated emotion information, and the icon reputation quotient may be acquired based on the accumulated icon information. A preference/avoidance quotient may be acquired based on the preference/avoidance information. The overall reputation quotient may be a reputation quotient that comprehensively reflects the emotion reputation quotient, the icon reputation quotient, and the preference/avoidance quotient. The overall reputation quotient may be calculated by varying a weight according to the type of the reputation quotient.

The personal information may include personal information such as nationality, name, gender, interest of a user using a video call service, etc.

Cyber money information may include information about cyber money with which a user using a video call service uses additional paid services. For example, when a user tries to conduct a video call with a counterpart who satisfies desired conditions, the user needs to pay a certain amount of cyber money.

The server 200 for providing a video call service may receive the evaluation information about the user using a video call service, and update the accumulated evaluation information and the reputation quotient corresponding to the user account, which are stored in the storage 230, based on the received evaluation information. The server 200 for providing a video call service may receive the emotion information or icon information corresponding to the gesture of a counterpart of the user using a video call service, as the evaluation information about the user. The server 200 for providing a video call service may acquire an updated reputation quotient from updated accumulated evaluation information, by varying a weight according to the type of the emotion information or the type of the icon information.

The server 200 for providing a video call service may manage the video call service based on the updated reputation quotient. For example, the server 200 for providing a video call service may manage the video call service by providing a video call matching additional service of matching a plurality of users using the video call service based on the updated reputation quotient. In another example, the server 200 for providing a video call service may manage the video call service by categorizing a plurality of users using the video call service based on the updated reputation quotient, and providing a user management additional service corresponding to each category to which each user belongs.

The server 200 for providing a video call service may transmit the updated accumulated evaluation information or the updated reputation quotient to the terminal 100 through the communication interface 240.

Figure 8:
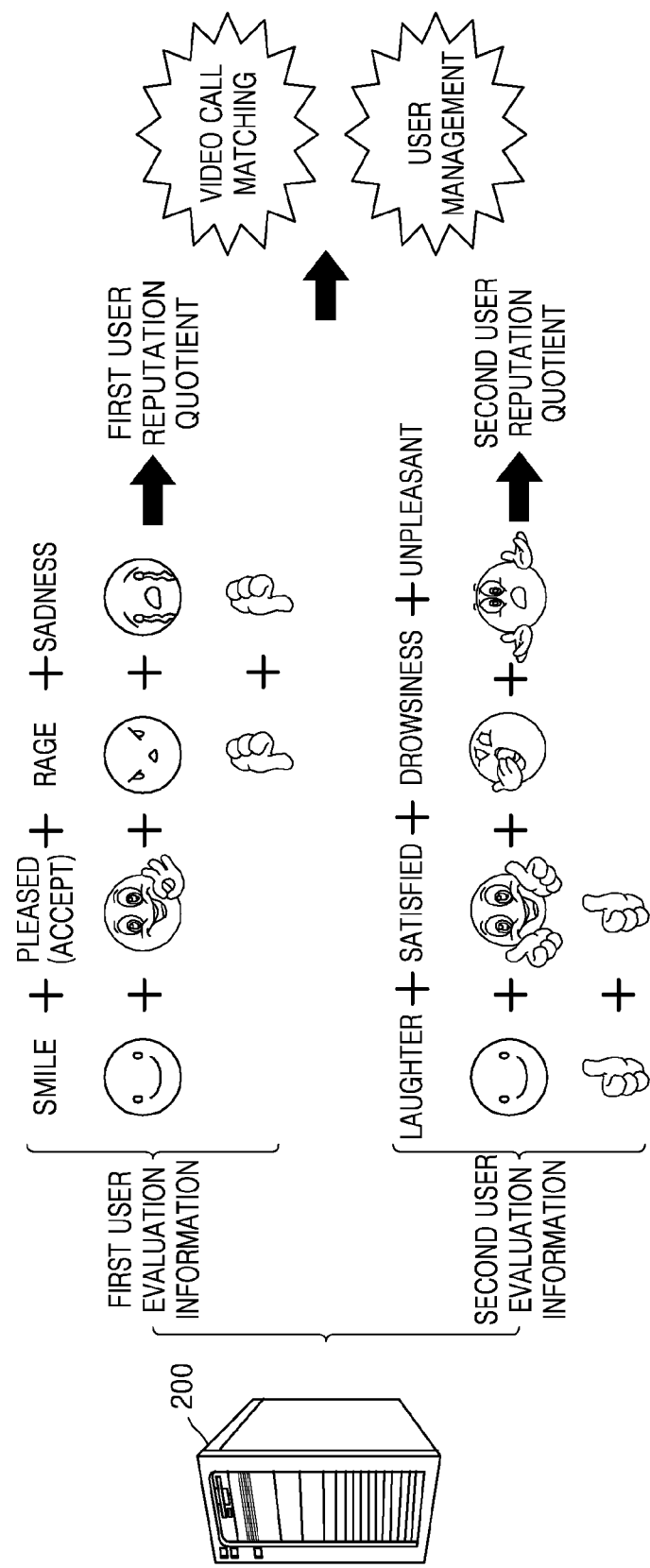
FIG. 8 illustrates a process of managing a video call service based on a reputation quotient of a user based on evaluation information received from the terminal, according to an embodiment.

FIG. 8 illustrates a process of managing a video call service based on a reputation quotient of a user based on the evaluation information received from the terminal 100, according to an embodiment.

The server 200 for providing a video call service may receive the evaluation information about the user using a video call service, and update the accumulated evaluation information corresponding to the user account and stored in the storage 230. The server 200 for providing a video call service may update the reputation quotient corresponding to the user account, based on the updated accumulated evaluation information corresponding to the user account.

Referring to FIG. 8, the server 200 for providing a video call service may receive emotion information such as "smile" or "good (accept)" and icon information such as "smile icon" or "OK icon", as the first user evaluation information. The server 200 for providing a video call service may update the received emotion information and icon information in the accumulated emotion information and the accumulated icon information. Accordingly, in a space corresponding to the first user's account in the storage 230, "smile", "good (accept)", "sad", and "rage" are stored as the accumulated emotion information, and "smile icon", "OK icon", "angry icon", and "tears icon" may be stored as the accumulated icon information. "Down" indicating avoidance or dislike may be stored twice in the accumulated preference/avoidance information. The server 200 for providing a video call service may update the reputation quotient based on the updated accumulated evaluation information corresponding to the first user's account. The server 200 for providing a video call service may acquire the emotion reputation quotient corresponding to the first user's account by varying a weight of each of "smile", "good (accept)", "sad", and "rage" that are the accumulated emotion information corresponding to the first user's account. The server 200 for providing a video call service may acquire the icon reputation quotient corresponding to the first user's account by varying a weight of each of a "smile icon", an "OK icon", an "angry icon", and a "tears icon" that are the accumulated icon information corresponding to the first user's account. The server 200 for providing a video call service may acquire the preference/avoidance quotient corresponding to the first user's account based on the two-time "down" that is the accumulated preference/avoidance information corresponding to the first user's account. The server 200 for providing a video call service may acquire the overall reputation quotient corresponding to the first user's account considering all of the emotion reputation quotient, the icon reputation quotient, and the preference/avoidance quotient corresponding to the first user's account. The server 200 for providing a video call service may calculate the overall reputation quotient by varying a weight according to the type of each reputation quotient corresponding to the first user's account.

Referring to FIG. 8, the server 200 for providing a video call service may receive the emotion information such as "laughter" or "satisfied" and the icon information such as a "laughing face icon" or a "thumbs-up icon", as the second user evaluation information. The server 200 for providing a video call service may update the received emotion information and icon information in the accumulated emotion information and the accumulated icon information, respectively. Accordingly, "laughter", "satisfied", "drowsiness", and "unpleasant" may be stored as the accumulated emotion information, and a "laughing face icon", a "thumbs-up icon", a "yawning icon", and an "upset icon" may be stored as the accumulated icon information, in a space corresponding to the second user's account in the storage 230. "Up" indicating preference or likability may be stored twice in accumulated preference/avoidance information. The server 200 for providing a video call service may update the reputation quotient based on the updated accumulated evaluation information corresponding to the second user's account. The server 200 for providing a video call service may acquire the emotion reputation quotient corresponding to the second user's account by varying a weight of each of "laughter", "satisfied", "drowsiness", and "unpleasant" that are the accumulated emotion information corresponding to the second user's account. The server 200 for providing a video call service may acquire the icon reputation quotient corresponding to the second user's account by varying a weight of each of the "laughing face icon", the "thumbs-up icon", the "yawning icon", and the "upset icon" that are the accumulated icon information corresponding to the second user's account. The server 200 for providing a video call service may acquire the preference/avoidance quotient corresponding to the second user's account based on the two "ups" that are the accumulated preference/avoidance information corresponding to the second user's account. The server 200 for providing a video call service may acquire the overall reputation quotient corresponding to the second user's account considering all of the icon reputation quotient, the preference/avoidance quotient, and the emotion reputation quotient corresponding to the second user's account. The server 200 for providing a video call service may calculate the overall reputation quotient by varying a weight according to the type of each reputation quotient corresponding to the second user's account.

The server 200 for providing a video call service may manage the video call service based on the above updated reputation quotient. The server 200 for providing a video call service may manage the video call service based on at least one of the emotion reputation quotient, the icon reputation quotient, the preference/avoidance quotient, and the overall reputation quotient.

Referring to FIG. 8, the server 200 for providing a video call service may manage the video call service by providing the video call matching additional service for matching a plurality of users using the video call service, based on the updated reputation quotient. For example, the server 200 for providing a video call service may provide the video call matching additional service by matching people in the same reputation quotient category, matching a paid user with a reputable user having a high reputation quotient, or matching a new subscriber of the video call service with a reputable user having a high reputation quotient, based on the updated reputation quotient of a plurality of users using the video call service.

Furthermore, the server 200 for providing a video call service may manage the video call service by categorizing a plurality of users using the video call service based on the updated reputation quotient and providing a user management additional service corresponding to each category to which each user belongs. For example, the server 200 for providing a video call service may provide the user management additional service corresponding to each category to which each user belongs, by categorizing a plurality of users using the video call service based on the updated reputation quotient of each user using the video call service and by providing different benefits according to the respective categories, previously warning a user in a category of a low reputation quotient not to be included in a blacklist, or temporarily or permanently banning a user in a category of a reputation quotient lower than a critical reputation quotient from using the video call service.

Figure 9:
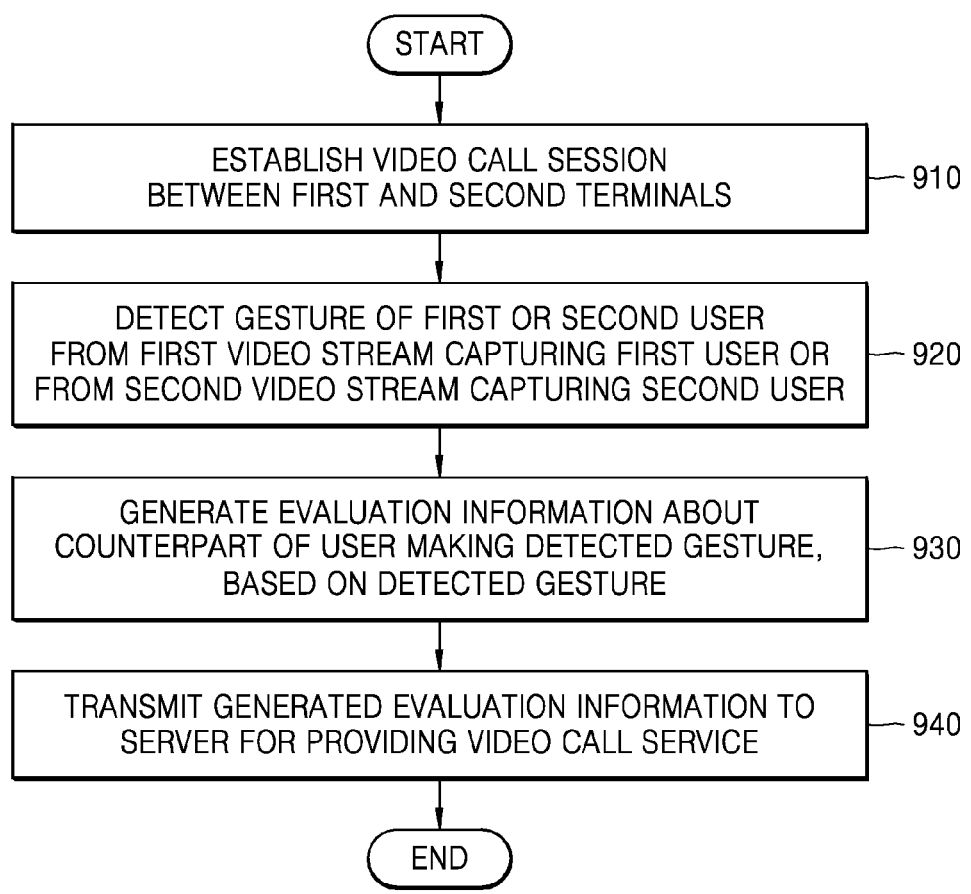
FIG. 9 is a flowchart of a method of providing a video call service by generating evaluation information corresponding to a gesture of a user of the video call service, according to an embodiment.

FIG. 9 is a flowchart of a method of providing a video call service by generating evaluation information corresponding to a gesture of a user of the video call service, according to an embodiment.

In operation 910, the first terminal 100-1 may establish a video call session between the first terminal 100-1 of the first user and the second terminal 100-2 of the second user who is the counterpart of the video call.

In operation 920, the first terminal 100-1 may detect a gesture of the first user or the second user from the first video stream that captures the first user or from the second video stream that captures the second user received from the second terminal 100-2.

When the first terminal 100-1 detects the gesture of the first user, the first terminal 100-1 may detect at least one gesture of facial expressions, body motions, and actions of the first user from the first video stream captured by the first terminal 100-1.

When the first terminal 100-1 detects the gesture of the second user, the first terminal 100-1 may detect at least one gesture of facial expressions, body motions, and actions of the second user from the second video stream received from the second terminal 100-2.

In operation 930, the first terminal 100-1 may generate the evaluation information about a counterpart of the user making the detected gesture, based on the detected gesture. The first terminal 100-1 may generate the emotion information or icon information corresponding to the detected gesture, as the evaluation information about the counterpart.

When the first terminal 100-1 detects the gesture of the first user, the first terminal 100-1 may generate the evaluation information about the second user based on the detected gesture.

When the first terminal 100-1 detects the gesture of the second user, the first terminal 100-1 may generate the evaluation information about the first user based on the detected gesture.

In operation 940, the first terminal 100-1 may transmit the generated evaluation information to the server 200 for providing a video call service.

When the first terminal 100-1 detects the gesture of the first user, the first terminal 100-1 may transmit the generated evaluation information about the second user corresponding to the second user's account to the server 200.

When the first terminal 100-1 detects the gesture of the second user, the first terminal 100-1 may transmit the generated evaluation information about the first user to the server 200 to correspond to the first user's account.

When the first terminal 100-1 detects the gesture of the first user, the first terminal 100-1 may transmit the generated evaluation information about the second user to the second terminal 100-2. Furthermore, the first terminal 100-1 may receive the evaluation information about the first user from the second terminal 100-2, and display the received evaluation information about the first user to overlap the area where the second video stream is displayed.

When the first terminal 100-1 detects the gesture of the second user, the first terminal 100-1 may display the generated evaluation information about the first user to overlap the area where the second video stream is displayed.

Figure 10:
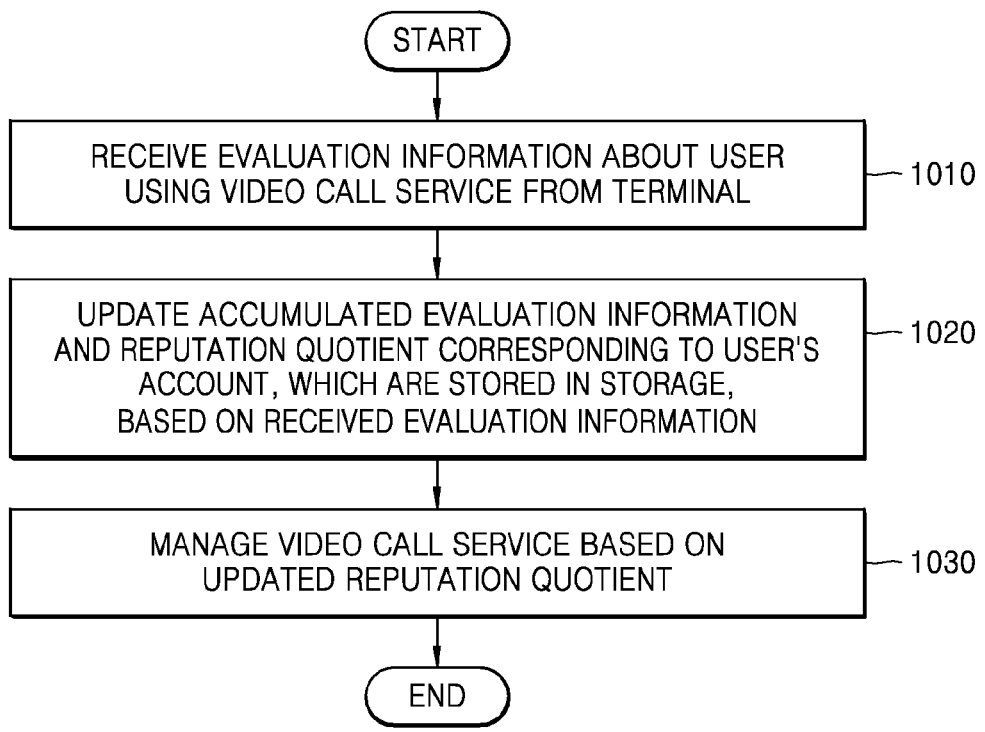
FIG. 10 is a flowchart of a method of providing a video call service based on a reputation quotient of a user, according to an embodiment.

FIG. 10 is a flowchart of a method of providing a video call service based on the reputation quotient of a user, according to an embodiment.

In operation 1010, the server 200 for providing a video call service may receive the evaluation information about a user using the video call service from the terminal 100 that supports the video call. The server 200 for providing a video call service may receive the emotion information or icon information corresponding to the gesture of a counterpart of the user using the video call service, as the evaluation information about the user.

In operation 1020, the server 200 for providing a video call service may update the accumulated evaluation information and the reputation quotient, which are stored in the storage 230, corresponding to the user account, based on the received evaluation information. The server 200 for providing a video call service may acquire the updated reputation quotient from the updated accumulated evaluation information, by varying a weight according to the type of emotion information or the type of icon information.

In operation 1030, the server 200 for providing a video call service may manage the video call service based on the updated reputation quotient. For example, the server 200 for providing a video call service may manage the video call service by providing the video call matching additional service for matching a plurality of users using the video call service based on the updated reputation quotient. In another example, the server 200 for providing a video call service may manage the video call service by categorizing a plurality of users using the video call service based on the updated reputation quotient, and providing the user management additional service corresponding to each category to which each user belongs.

The server 200 for providing a video call service may transmit the updated accumulated evaluation information or the updated reputation quotient to the terminal 100 using the video call service through the communication interface 240.

The above-described embodiments related to the method of providing a video call service by generating evaluation information corresponding to a gesture of a user of the video call service may be provided in the form of an application stored in a computer-readable storage medium to perform a method of providing a video call service by generating evaluation information corresponding to a gesture of a user of a video call service, in the terminal 100 for providing a video call service. In other words, the embodiment may be provided in the form of an application or a computer program stored in a computer-readable storage medium so that the terminal 100 may perform the above-described operations of the method of providing a video call service.

The embodiments related to the method of providing a video call service based on the reputation quotient of a user may be provided in the form of a computer program stored in a computer-readable storage medium so that the method of providing a video call service may be performed by the server 200 based on the reputation quotient of a user. In other words, the embodiments may be provided in the form of a computer program or an application stored in a computer-readable storage medium so that the server 200 may perform the above-described operations of the method of providing a video call service.

The above-described embodiment may be implemented in the form of a computer-readable storage medium for storing instructions of data executable by a computer or a processor. At least one of the instruction and data may be stored in the form of a program code, and when performed by a processor, may perform a certain operation by generating a certain program module. Such a computer-readable storage medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage apparatuses, optical data storage apparatuses, hard disks, solid-state disks (SSDs), and any apparatus capable of storing instructions or software, related data, data files, and data structures, and providing the instructions or software, related data, data files, and data structures to a processor or a computer so that the processor or the computer may execute the instructions.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A method of providing a video call service, the method comprising:
   establishing a video call session between a first terminal of a first user and a second terminal of a second user who is a counterpart of the video call;
   detecting a gesture of the first user or the second user from a first video stream that captures the first user or from a second video stream that captures the second user, the second video stream being received from the second terminal;
   generating, based on the detected gesture, evaluation information about a counterpart of a user making the detected gesture, the counterpart having caused the detected gesture; and
   transmitting generated evaluation information to a server for providing a video call service.

2. The method of claim 1, wherein, in the generating of the evaluation information about the counterpart of the user making the detected gesture, emotion information or icon information corresponding to the detected gesture is generated as the evaluation information about the counterpart.

3. The method of claim 1, wherein, when the gesture of the first user is detected, the detecting of the gesture comprises detecting at least one gesture of facial expressions, body motions, and actions of the first user from the first video stream captured by the first terminal,
   the generating of the evaluation information about the counterpart comprises generating evaluation information about the second user based on the detected gesture, and
   the transmitting of the generated evaluation information to the server comprises transmitting the generated evaluation information about the second user to the server to correspond to a second user's account.

4. The method of claim 3, further comprising transmitting the generated evaluation information about the second user to the second terminal.

5. The method of claim 3, further comprising:
   receiving evaluation information about the first user from the second terminal; and
   displaying the received evaluation information about the first user overlapping an area where the second video stream is displayed.

6. The method of claim 1, wherein, when the gesture of the second user is detected, the detecting of the gesture comprises detecting at least one gesture of facial expressions, body motions, and actions of the second user from the second video stream received by the second terminal,
   the generating of the evaluation information about the counterpart comprises generating evaluation information about the first user based on the detected gesture, and
   the transmitting of the generated evaluation information to the server comprises transmitting the generated evaluation information about the first user to the server to correspond to a first user's account.

7. The method of claim 6, further comprising:
displaying the generated evaluation information about the first user overlapping an area where the second video stream is displayed.

8. A server for providing a video call service, the server comprising:
a communication interface configured to perform communication with a terminal supporting a video call;
a storage;
a processor; and
a memory configured to store instructions that are executable by the processor,
wherein the processor, by executing the instructions, receives, from the terminal, evaluation information about a user who caused a gesture made by a counterpart of the user, updates accumulated evaluation information and a reputation quotient corresponding to a user account stored in the storage, based on received evaluation information, and manages the video call service based on an updated reputation quotient.

9. The server of claim 8, wherein the processor receives emotion information or icon information corresponding to the gesture made by the counterpart of the user, as evaluation information about the user.

10. The server of claim 9, wherein the processor acquires the updated reputation quotient from updated accumulated evaluation information by varying a weight according to a type of the emotion information or a type of the icon information.

11. The server of claim 8, wherein the processor manages the video call service by providing a video call matching additional service for matching a plurality of users using the video call service based on the updated reputation quotient.

12. The server of claim 8, wherein the processor manages the video call service by categorizing a plurality of users using the video call service based on the updated reputation quotient, and providing a user management additional service corresponding to each category to which each user belongs.

13. The server of claim 8, wherein the processor transmits updated accumulated evaluation information or the updated reputation quotient to the terminal through the communication interface.

14. The server of claim 8, wherein the storage stores, for each user account of each of a plurality of users using the video call service, a plurality of types of accumulated evaluation information, a reputation quotient corresponding to each accumulated evaluation information, and an overall reputation quotient reflecting all types of reputation quotients.

15. A non-transitory computer-readable storage medium storing instructions that are executable by a processor, the instructions comprising:
instructions to establish a video call session between a first terminal of a first user and a second terminal of a second user who is a counterpart of the video call;
instructions to detect a gesture of the first user or the second user from a first video stream that captures the first user or from a second video stream that captures the second user, the second video stream being received from the second terminal;
instructions to generate, based on the detected gesture, evaluation information about a counterpart of a user making the detected gesture, the counterpart having caused the detected gesture; and
instructions to transmit generated evaluation information to a server for providing a video call service.

* * * * *